United States Patent [19]

Uchikura

[11] Patent Number: 5,337,346

[45] Date of Patent: Aug. 9, 1994

[54] PORTABLE TELEPHONE APPARATUS INCLUDING ELECTRONIC NOTEBOOK FUNCTION

[75] Inventor: Takao Uchikura, Ome, Japan

[73] Assignee: Casio Computer Co., Ltd., Tokyo, Japan

[21] Appl. No.: 951,455

[22] Filed: Sep. 25, 1992

[30] Foreign Application Priority Data

Sep. 26, 1991 [JP] Japan .................... 3-247282

[51] Int. Cl.⁵ .......................... H04M 11/00
[52] U.S. Cl. ............................ 379/58; 379/61
[58] Field of Search .............. 379/58, 61, 155, 354, 379/355, 434; 370/29; 361/391

[56] References Cited

U.S. PATENT DOCUMENTS

| | | | |
|---|---|---|---|
| 4,481,382 | 11/1984 | Villa-Real | 379/61 |
| 4,953,198 | 8/1990 | Daly et al. | 379/61 |
| 5,020,051 | 5/1991 | Beesley et al. | 370/29 |
| 5,020,090 | 5/1991 | Morris | 379/58 |
| 5,081,668 | 1/1992 | Ito | 379/58 |
| 5,128,981 | 7/1992 | Tsukamoto et al. | 379/58 |
| 5,175,759 | 12/1992 | Metroka et al. | 379/58 |

FOREIGN PATENT DOCUMENTS

| | | | |
|---|---|---|---|
| 4108169 | 9/1991 | Fed. Rep. of Germany | 379/58 |
| 4152724 | 5/1992 | Japan | 379/58 |

OTHER PUBLICATIONS

Radio Shack, 1985 Catalog, #380, pp. 162, 164, 165, 168, 176.
Radio Shack, 1991 Catalog, #459, pp. 2, 162, 165.

*Primary Examiner*—Curtis Kuntz
*Assistant Examiner*—William Cumming
*Attorney, Agent, or Firm*—Frishauf, Holtz, Goodman & Woodward

[57] ABSTRACT

In a portable telephone apparatus equipped with an electronic notebook function, a telephone operation key such as a dialing key is mounted on an upper surface of an openable/closable member mounted on an upper surface of a case body, whereas electronic notebook operation keys such as a character input key are provided at a region of a surface of the case body covered by the openable/closable member, and also at a rear surface of the openable/closable member. The portable telephone apparatus further includes a switch for detecting an opening/closing state of the openable/closable member, and a mode selecting unit for selecting a telephone mode and an electronic notebook mode in response to a detection signal derived from the detecting signal. Furthermore, a search key for searching storage data about the electronic notebook is employed on this upper surface of the openable/closable member. When this search key is operated, electronic notebook data such as telephone directory data constructed of one pair of a telephone number and a name, may be displayed on a display unit.

8 Claims, 9 Drawing Sheets

| NAME | TEL No. |
|---|---|

TM

| CONTENTS OF SCHEDULE | START TIME | END TIME |
|---|---|---|

SM

MEMO DATA

PORTABLE TELEPHONE APPARATUS INCLUDING ELECTRONIC NOTEBOOK FUNCTION

BACKGROUND OF THE INVENTION

1. Field of the Invention

The present invention generally relates to a portable telephone apparatus. More specifically, the present invention is directed to a portable telephone set including an electronic notebook function capable of registering a plurality of telephone directory data. So-called "telephone directory data" is constructed of one set of name data and telephone number data.

2. Description of the Prior Art

Various types of portable telephone sets or apparatuses have been widely marketed due to convenient functions thereof, for instance, everywhere and every time a telephone conversation is available. However, it is practically difficult for every one to correctly remember a large number of telephone numbers of friends, business partners, and community members etc. In a specific case, even if surnames or titles of firms are clearly memorized, last names or names of departments could not be correctly found out. To avoid such a problem, other types of portable telephone sets are very recently commercially available, in which a plurality of so-termed "telephone directory data" arranged by a pair of name data and telephone number data can be registered. In this typical conventional portable telephone set, 10 numeral keys of dialing are utilized as keys for entering character data required to register these names and titles.

However, even when an alphabetic character is employed which needs a smaller character number than other characters, there are approximately 40 sorts of key input data, namely 10 sorts of numeral data, 26 sorts of character data, and several sorts of symbol data. As a consequence, the respective numeral keys used for the dialing function must have 4 or more sorts of key functions. For instance, the numeral key "1" owns 4 different key functions to enter numeral data "1", character data "A", "B" and "C". On the other hand, the above-described conventional portable telephone set is equipped with the data input mode switch for selecting the numeral data input mode and the character data input mode. When, for example, the character data "C" is inputted, even if the character data input mode has been selected by operating the data input mode switch, the key for shifting the input digit must be manipulated after the numeral key "1" has been operated three times. In other words, the conventional portable telephone sets have such a drawback that the key operation must be performed at least four times, depending upon sorts of characters, namely a very cumbersome data input operation is necessarily required.

The present invention has been made in an attempt to solve the above-described drawback, and therefore, has an object to provide a portable telephone apparatus including an electronic notebook function, capable of simply dialing and also of simply performing a data input operation such as a telephone directory data entry operation.

Another object of the present invention is to provide a portable telephone apparatus including an electronic notebook, capable of automatically selecting a telephone mode and an electronic notebook mode. In the telephone mode, a dialing operation is available, whereas in the electronic notebook mode, a data input operation is available.

A further object of the present invention is to provide a portable telephone apparatus including an electronic notebook function, capable of searching data about the electronic notebook in a telephone mode.

SUMMARY OF THE INVENTION

To achieve the above-described objects and other features of the present invention, a portable telephone apparatus equipped with an electronic notebook function according to the present invention comprises a plurality of telephone operation keys provided on an outer surface of an openable/closable member;

a case body to which said openable/closable member is pivotally journaled; and a plurality of electronic notebook operation keys provided at a rear surface of said openable/closable member and also at a region of a surface of the case body, which is covered with the openable/closable member,

BRIEF DESCRIPTION OF THE DRAWINGS

For a better understanding of the present invention, reference is made of the following descriptions in conjunction with the accompanying drawings.

DETAILED DESCRIPTION OF THE PREFERRED EMBODIMENTS

Construction of First Portable Telephone Apparatus

Figure 1:
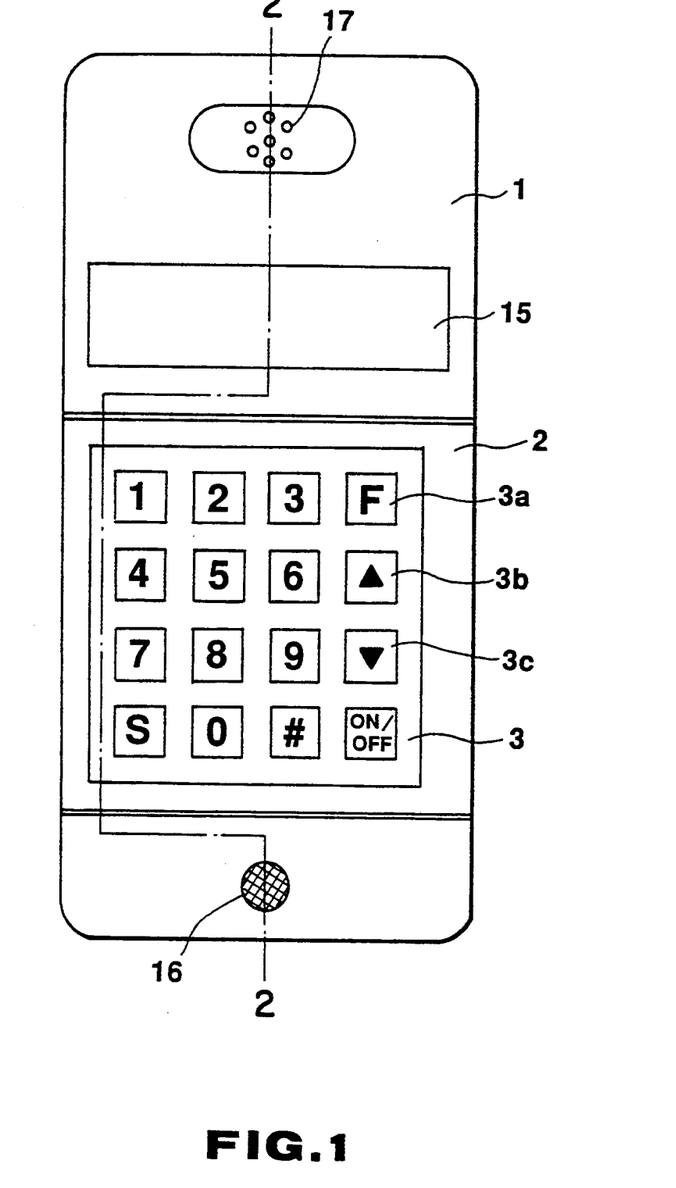
FIG. 1 is a plan view of an outer view of a portable telephone apparatus according to a first preferred embodiment of the present invention.
Figure 2:
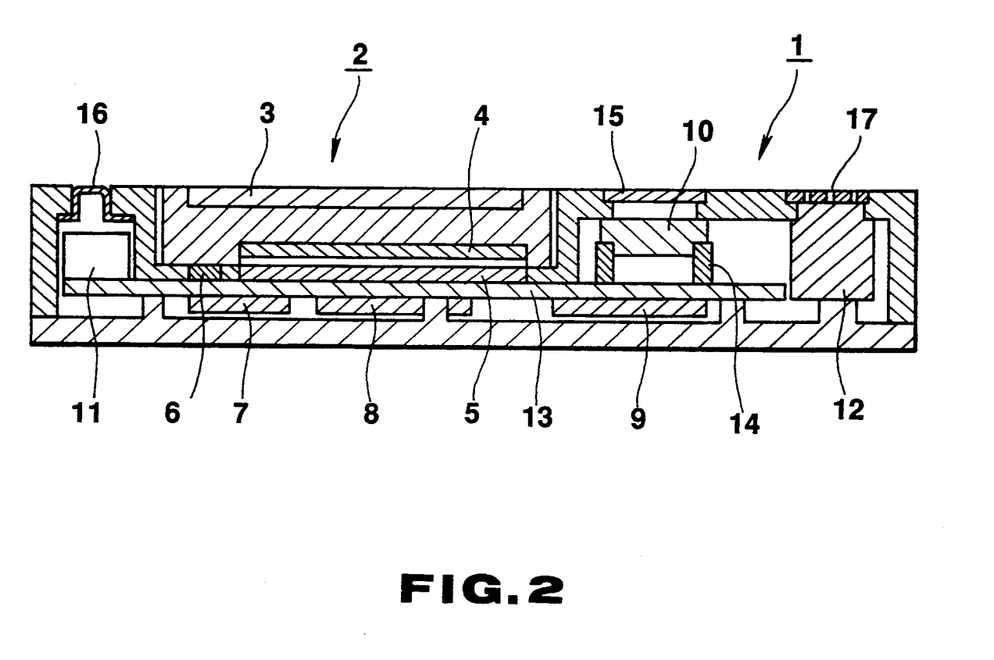
FIG. 2 is a sectional view of the portable telephone apparatus, taken along a line 2—2 of FIG. 1.
Figure 3:
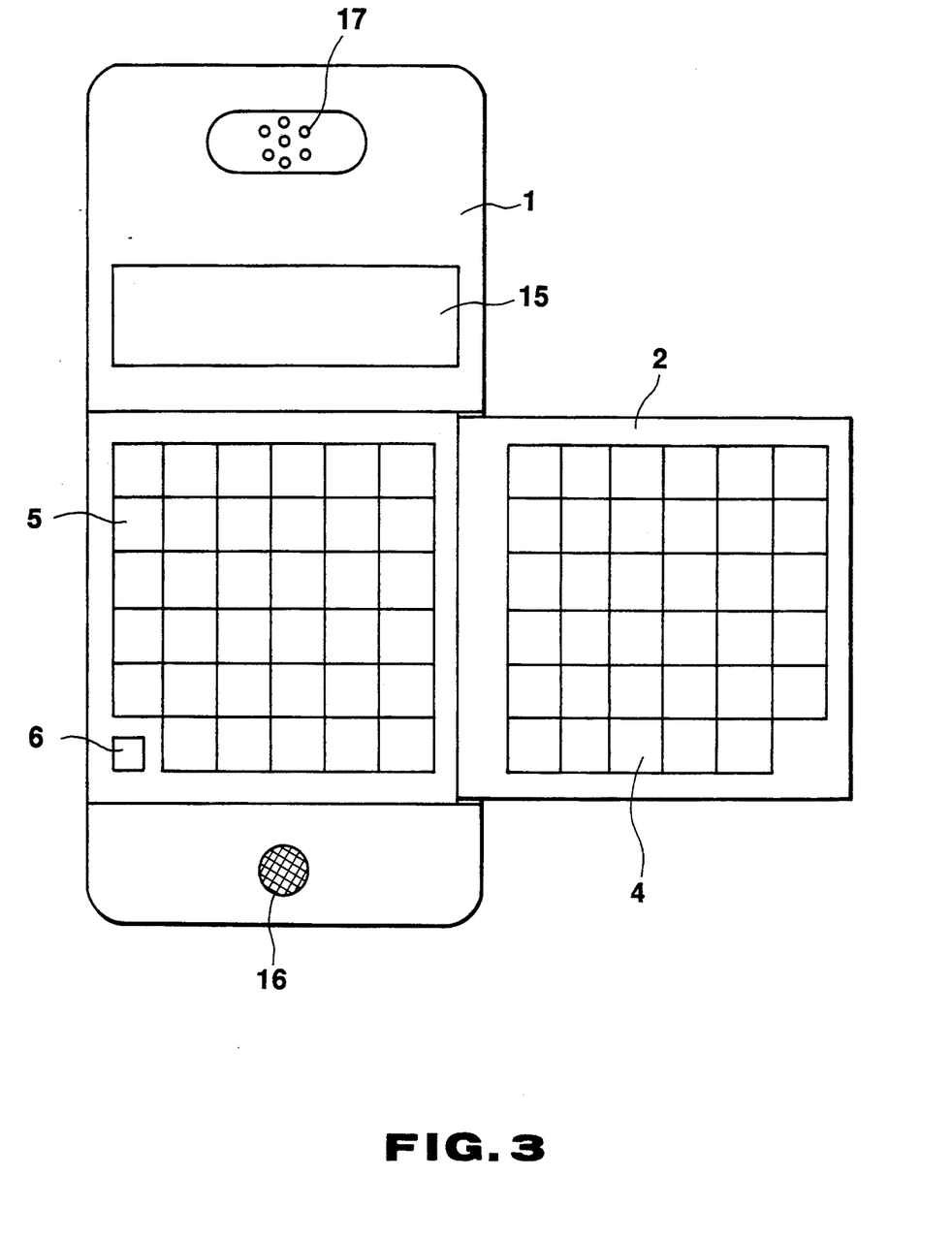
FIG. 3 is a front view of the portable telephone apparatus under the condition that an openable/closable member is opened.

FIG. 1 is a front view for indicating an outer view of a portable telephone apparatus according to a first preferred embodiment of the present invention. FIG. 2 is a sectional view of the first portable telephone apparatus, taken along a line 2—2 of FIG. 1. FIG. 3 is a front view of the first portable telephone apparatus having a member under an open condition.

In these drawings, reference numeral 1 indicates a case body for storing a large number of electronic components which constitute an electronic circuit (will be described later), and reference numeral 2 shows an openable/closable member hinged to the case body 1 at a right edge portion of an upper surface of this case body 1. On an upper surface of this operable/closable member 2, there are provided a telephone keyboard 3 equipped with an ON/OFF key for turning ON/OFF a telephone function, 10 numeral entry keys for a dialing purpose, a # key, and a transmission key (S key) manipulated when a telephone call is made, and also when a telephone call is accepted. As shown in FIG. 1, in this first preferred embodiment, keys 3a, 3b and 3c used to search data about an electronic notebook (will be discussed later) are furthermore provided on this telephone keyboard 3. The first key 3a ("F" key) is to select sort of electronic notebook data, the second key 3b ("Δ" key) is to sequentially select the respective data included in the selected data, and the third key 3c ("v" key) is to successively select the respective data included in the selected data in a direction opposite to that of the above-described "Δ" key. A keyboard 4 for the electronic notebook is provided at a lower surface of the openable/closable member 2.

As illustrated in FIGS. 2 and 3, the keyboard for the electronic notebook is also provided on the surface of the case body 1 covered with the openable/closable member 2. Then, a large number of keys required to control the function of the electronic notebook and also to enter data, are provided on the keyboard 4 of the electronic notebook and a keyboard 5 of the electronic notebook mounted on the case body 1 in a separate form. These keys are various control keys, numeral entry keys, character keys and symbol keys. The keyboard 4 is provided on the openable/closable member 2. A depression button type switch 6 is provided on the case body 1 adjacent the keyboard 5 for the electronic notebook, which is turned ON/OFF when the openable/closable member 2 is opened/closed. This switch 6 is to detect to opening/closing states of the openable/closable member 2. In the first preferred embodiment, in response to the state detection signal of this switch 6, both of the mode selection control for selecting the telephone function mode and the electronic notebook function mode, and the power supply control for supplying power to the radio communication circuit unit 21 are carried out. More specifically, when the switch 6 is turned ON, namely when the openable/closable member 2 is closed, the telephone function mode is selected so that the display mode is set to the display mode for the telephone and the power is supplied to the radio communication circuit unit 21. Conversely, when the switch 6 is turned OFF, namely when the openable/closable member 2 is opened, the electronic notebook mode is set. Thus, the display mode is set to the display mode for the electronic notebook and the power supply to the radio communication circuit unit 21 is interrupted.

Then, electronic components except for the above-described keyboards 3, 4, 5 and switch 6 for constituting an electronic circuit are stored in the case body 1. That is, LSI (large-scale integration) 7, 8 and 9 for constructing the radio communication circuit unit, the data memory for the electronic notebook, and the control circuit, a display unit 10, a microphone 11, a speaker 12 and a circuit board 13 for electrically connecting these electronic components. Reference numeral 14 indicates an inner connector for electrically connecting the display unit 10 to a predetermined terminal on the circuit board 13. Although not shown in the drawings, an antenna for receiving a radio (wireless) signal, a sound producing element for a calling purpose, and a power source battery are provided in the case body 1. Then, a display window 15 for the display unit 10, a through hole 16 for the microphone 11 and a through hole 17 for the speaker 12 are formed in the upper surface of the case body 1.

Circuit Arrangement of First Portable Telephone Apparatus

Figure 4:
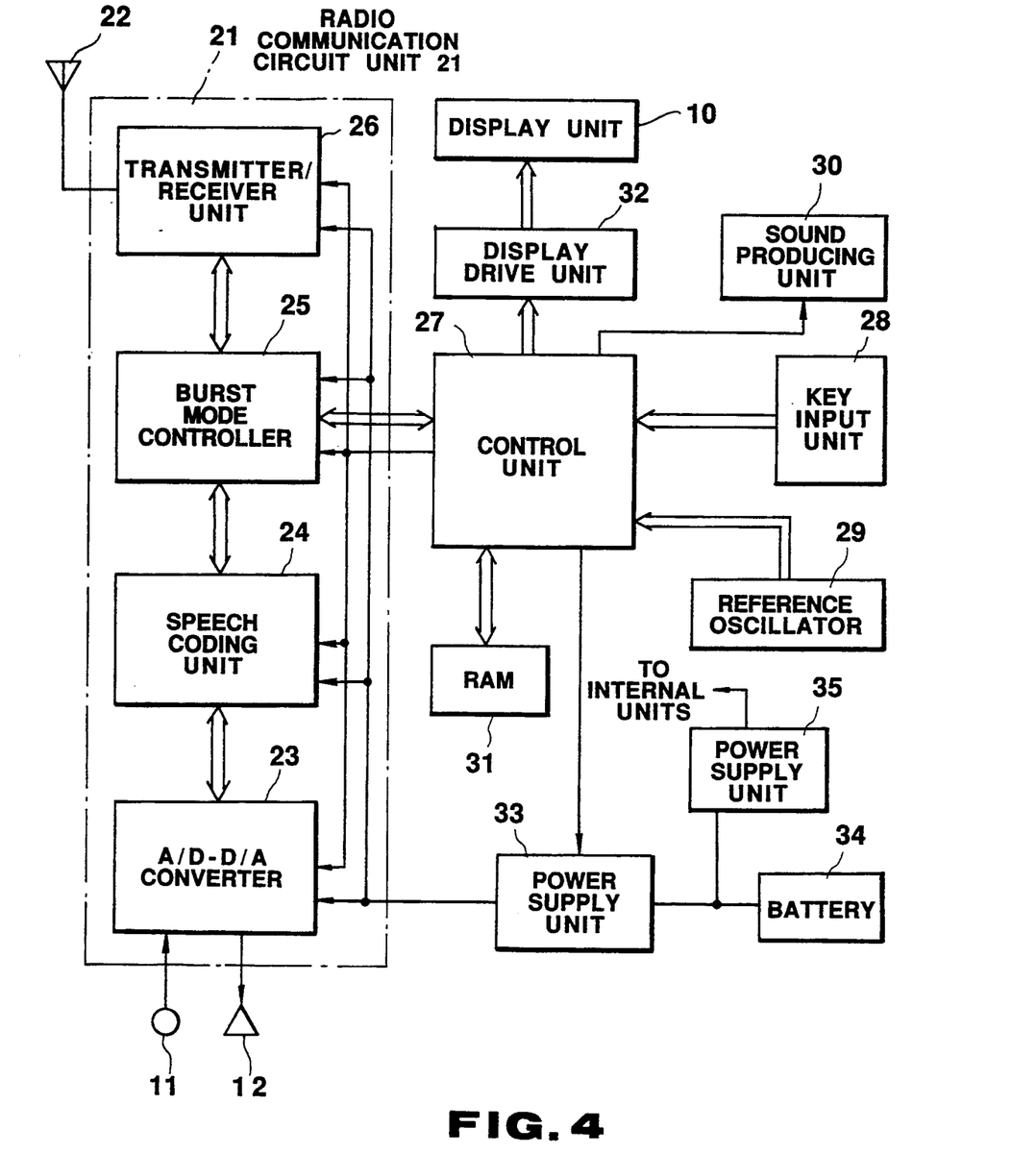
FIG. 4 is a schematic block diagram for representing an electronic circuit employed in the portable telephone apparatus.

In FIG. 4, there is shown a circuit block diagram of an electronic circuit of the first portable telephone apparatus.

In this drawing, reference numeral 21 shows a radio, communication circuit unit (radio telephone circuit unit). This radio communication unit 21 is such a circuit for converting an acoustic (audio) signal inputted from the microphone 11 into a radio signal to transmit this radio signal from the antenna 22, and for converting another radio signal received by the antenna 22 into an acoustic signal to supply the acoustic signal to the speaker 12. The type of this radio communication circuit arrangement is varied, depending upon the modulating system and the transmitting system. If the digital modulation system is employed and also the TDMA (Time Division Multiplex Access)-TDD (Time Division Duplex) transmitting system is employed, this radio communication circuit unit 21 is so arranged, as shown in FIG. 4, by an A/D-D/A converting circuit unit 23, a speech coding unit 24, a burst mode controller 25 and a transmitter/receiver circuit unit 26. The A/D-D/A converting circuit unit 23 converts the analog audio signal derived from the microphone 11 into the digital audio signal and supplies this digital audio signal to the speech coding unit 24. Furthermore, the digital audio signal from the speech coding unit 24 is converted into the analog audio signal and the resultant analog audio signal is sent to the speaker 12 by this A/D-D/A converting circuit 23. The speech coding unit 24 compresses the data of the digital audio signal supplied from the A/D-D/A converting circuit unit 23 by the audio coding system with a higher efficiency, and then supplies the compressed digital audio data to the burst mode controller 25. Also, this speech coding unit 24 expands the compressed digital audio data derived from the burst mode controller 25 to the original data length thereof which will be sent to the A/D-D/A converting circuit 23. The burst mode controller 25 is such a circuit for performing a synchronization process and a frame process of the transmission/receiving signals based on the TDMA-TDD system. This burst mode controller 25 determines a transmission frame (time slot) when the radio communication is established between this first portable telephone apparatus and a radio station (not shown in detail), and also sends the data of the digital audio signal supplied from the speech coding unit 24 and control data (will be discussed later) supplied from a control unit 27 based on the determined transmission frame to the radio transmitter/receiver circuit unit 26. The burst mode controller 25 synchronizes the signal transmitted from the radio base station (not shown in detail), which is received in the burst mode by the transmitter/receiver circuit unit 26, decodes the received signal, and sends out a control signal portion contained in this received signal to the control unit 27, and also an audio signal portion contained in this received signal to the speech coding unit 24. The function of the transmitter/receiver circuit unit 26 is to transmit/receive the radio signal digitally modulated between the radio station and the first radio telephone apparatus in accordance with the TDMA-TDD system (method). This transmitter/receiver circuit unit 26 is arranged by a transmitter circuit for transmitting the digital-modulated radio signal, a receiver circuit for receiving the digital-modulated radio signal so as to demodulate this digital-modulated radio signal, and a frequency synthesizer for changing the frequency of the radio signal when the communication is established between the radio station (not shown in detail) and this first radio telephone apparatus. These internal circuits of the radio communication circuit unit 21 are controlled by the above-described control unit 27.

In response to signals supplied from the above-explained burst mode controller 25, and key input unit 28 containing the above-described three keyboards 3, 4, 5 and switch 6, the control unit 27 is to control the respective circuit units, as described above. This control unit 27 includes a microprocessor, a ROM (read-only memory) for previously storing a control program executed by this microprocessor, and a RAM (random access memory) for temporarily storing processed data and the like during the execution of the control program. It should be noted that the above-described ROM previously stores therein a call number specific to this first portable telephone apparatus (namely, ID code), pattern data such as characters and numerals displayed on the display unit 10, and data indicative of a mode name.

To this control unit 27, the respective circuits 23 to 26 for constituting the radio communication circuit unit 21 and the key input unit 28 are connected, and furthermore, an oscillating circuit unit 29 for outputting a reference clock signal, a sound producing unit 30, a RAM (random access memory) 31, a display drive unit 32 coupled to the above-described display unit 10, and a power supply circuit 33 for supply power to the radio communication circuit unit 21 are connected.

The sound producing unit 30 is such a circuit containing a compact speaker or a sound producing member such as a piezoelectric vibrator. The control unit 27 compares the received call number supplied from the burst mode controller 25 of the radio communication circuit unit 21 with the self calling number stored in the ROM, and drives the sound producing unit 30 to produce the sound when a judgement is made that both of these numbers are coincident with each other.

Memory Table of RAM 31

Figure 5:
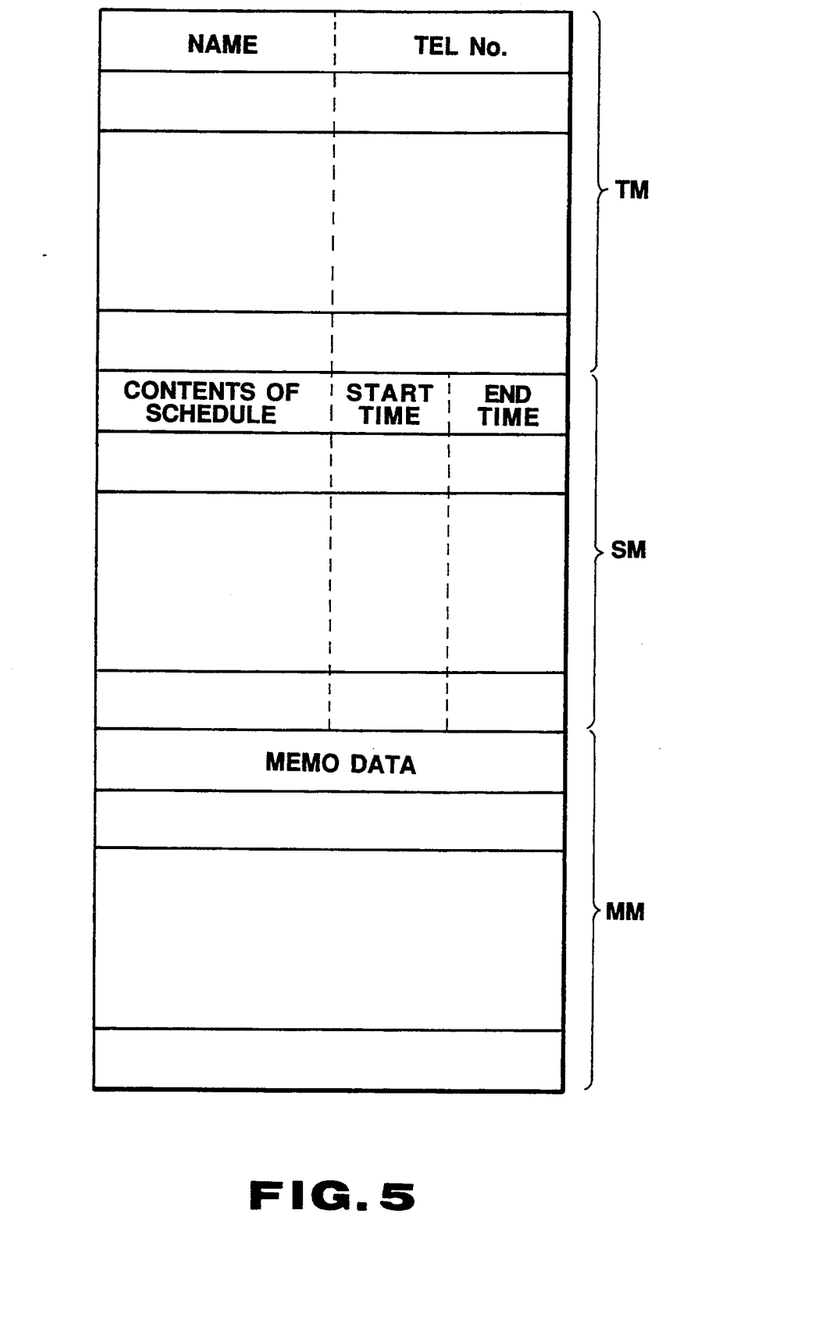
FIG. 5 schematically shows a memory map of a RAM 31 shown in FIG. 4.

The RAM 31 is a memory for storing data about the electronic notebook. As represented in FIG. 5, the RAM 31 includes a telephone directory data storage unit TM having a plurality of storage areas; a schedule data storage unit SM, and a memorandum data storage unit MM. Each of these storage areas of the telephone directory data storage unit TM is subdivided to a subarea for storing names and the like, and a subarea for storing telephone numbers, the name and telephone number data which have been entered by the electronic notebook keyboards 4 and 5, are subdivided and thereafter stored into the corresponding subareas. Similarly, each of storage areas of the schedule data storage unit SM are subdivided into a subarea for storing a content of a schedule, a subarea for storing a starting date/time, and a subarea for storing an ending date/time. It should be noted that the storage area of the memorandum data storage unit MM is not subdivided, and therefore the data inputted from the electronic notebook keyboards 4 and 5 are stored into this storage area within one memory time. Then, the data stored in these memory units are displayed on the display unit 10 via the control unit 27 and the display drive unit 32 by operating the data searching keys (namely, the above-described keys 3a, 3b and 3c) provided on the telephone keyboard 3, and also the data searching key provided on either the electronic notebook keyboard 4 or 5.

Figure 6:
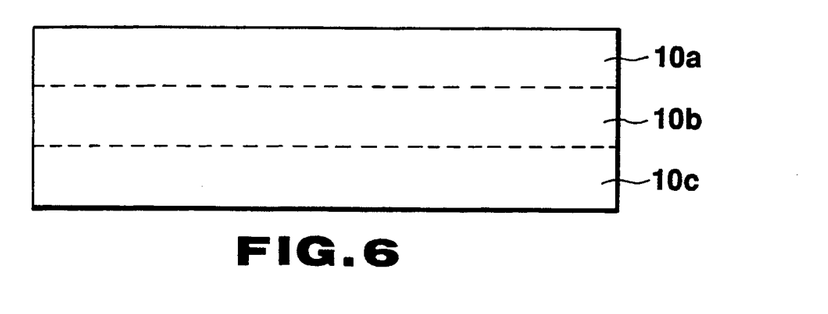
FIG. 6 represents a construction of a display area of a display unit 10.
Figure 7:
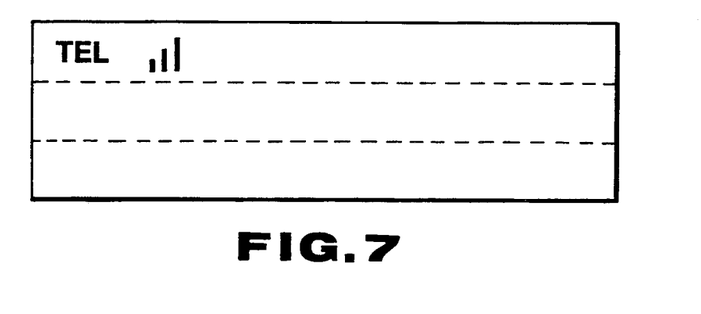
FIG. 7 represents an example of the representation of the display unit 10.
Figure 8:
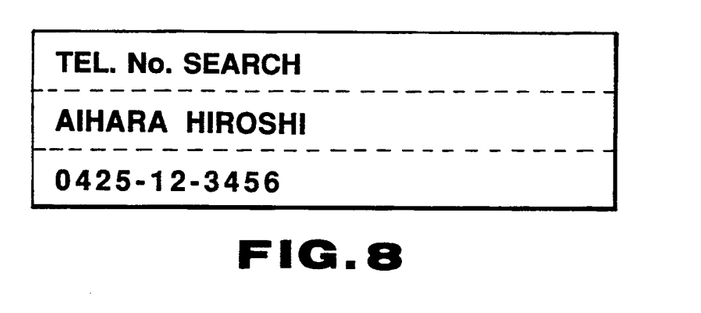
FIG. 8 indicates another example of the representation of the display unit 10.

The display unit 10 is constructed of, for instance, a matrix type liquid crystal display apparatus. The display area of this display unit 10 is subdivided into three areas 10a, 10b and 10c as represented in FIG. 6, for example. The area 10a corresponds to such an area for displaying the selected function name, mode name, and condition information, whereas the areas 10b and 10c correspond to areas for displaying the data inputted from the key input unit 28 and the data read out from the RAM 31. As represented in FIG. 7, the mode name "TEL" and a mark indicative of reception sensitivity are displayed in the area 10a. Then, the dialing data inputted by manipulating the numeral entry keys of the keyboard 3 are displayed on the area 10c. When the mode is selected to the telephone directory search mode in the electronic notebook mode, as shown in FIG. 8, the mode name "TEL. No. SEARCH" is displayed on the area 10a, and also the name portion of the searched date and the telephone number portion thereof are displayed on the area 10b and 10c, respectively. In the electronic notebook mode, indications in the other modes, will be displayed in a similar manner as shown in FIG. 8.

The power source circuit 33 is to supply power from the power battery 34 to the respective circuits 23 to 26 of the radio communication circuit unit 21. In this power source circuit 33, a switching circuit employing a switching element, for instance, transistors and the like are provided. The control unit 27 turns ON/OFF the above switching circuit in response to the operation signals of the ON/OFF keys employed in the telephone keyboard 3 and the condition signal of the detection switch 6 provided on the case body 1, and also controls the power supply to the radio communication circuit unit 21. Concretely speaking, when the detection switch 6 is brought into the ON-state, namely when the openable/closable member 2 is closed, the switching circuit is turned ON/OFF every time the ON/OFF key is manipulated. To the contrary, when the detection switch 6 is brought into the OFF-state, namely when the openable/closable member 2 is opened, the switching circuit is turned OFF without any conditions. In other words, in accordance with the portable telephone apparatus of this preferred embodiment, when the openable/closable member 2 is closed, the power supply to the radio communication circuit unit 21 may be arbitrarily interrupted/commenced by operating the ON/OFF key, whereas when the openable/closable member 2 is opened, the power supply to the radio communication circuit unit 21 may be automatically interrupted. As a consequence, when the openable/closable member 2 is opened, namely when the electronic notebook mode is selected in this portable telephone apparatus, since no call is acceptable, an operator of this portable telephone apparatus, who is registering the data required for the electronic notebook, is not bothered by the telephone calling.

It should be noted that power is supplied from a second power source circuit 35 to other circuit portions than the radio communication circuit unit 21.

Operation Flow of First Portable Telephone Apparatus

Figure 9:
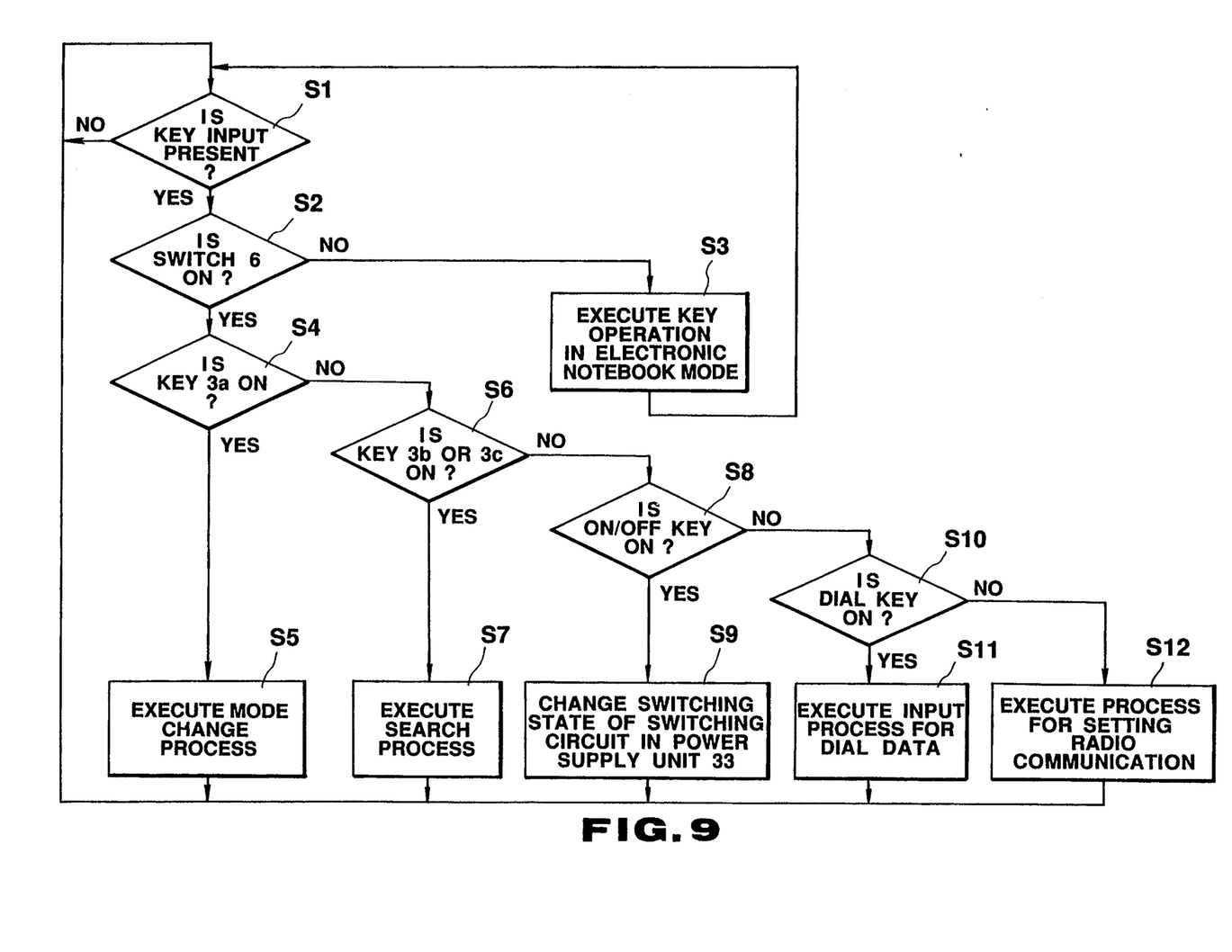
FIG. 9 is a flow chart for explaining an operation of the portable telephone apparatus in response to key operations.
Figure 10:
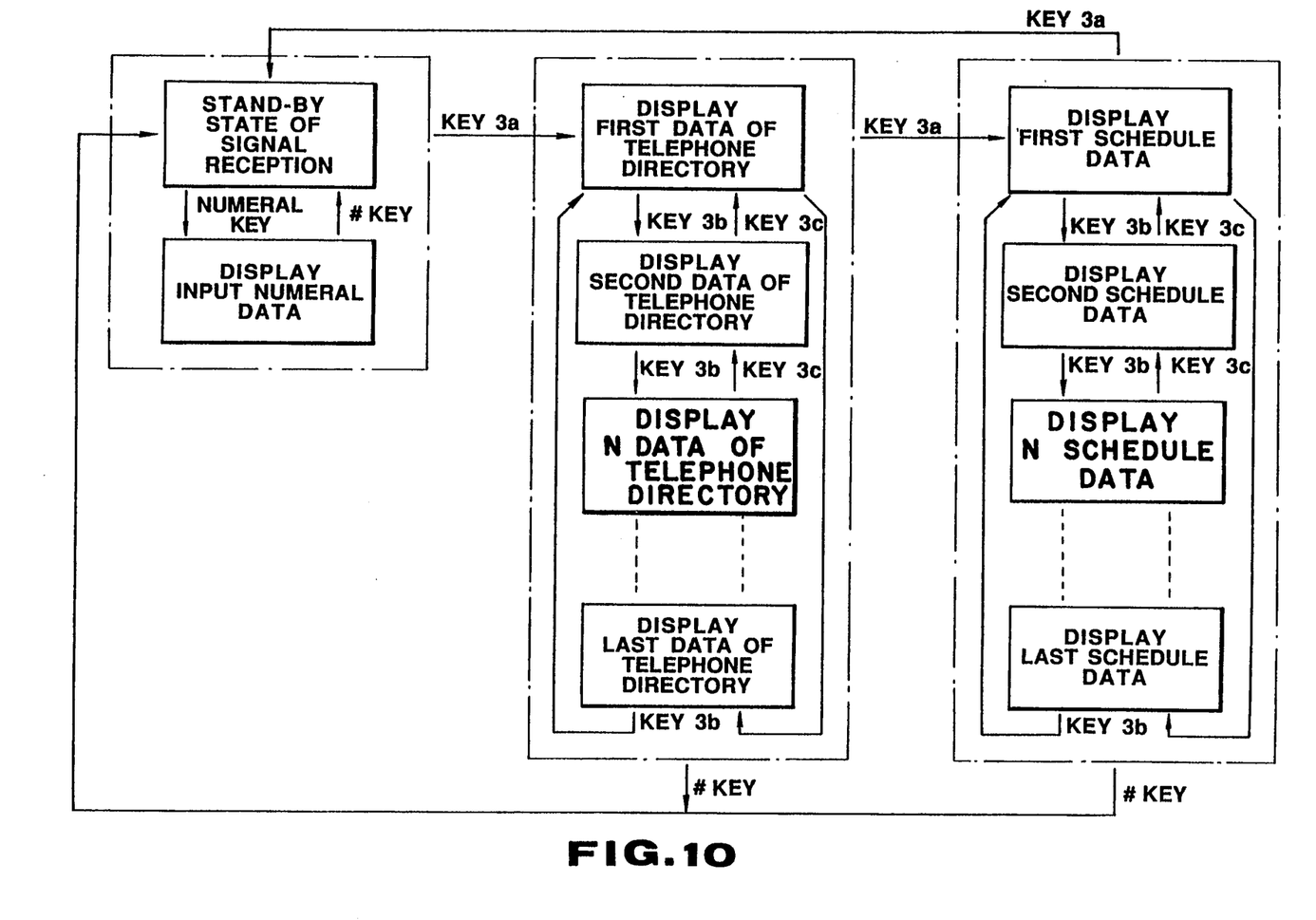
FIG. 10 represents a key function.

Referring now to FIGS. 9 and 10, an operation of the first portable telephone apparatus with the above-described circuit arrangement will be explained. FIG. 9 is a flow chart for representing an operation flow of this portable telephone apparatus with the above-explained key operations. FIG. 10 represents key functions of various keys employed on the telephone keyboard 3.

In FIG. 9, at a step S1, a judgement is made as to whether or not the key input signal is issued from the key input unit 28. In other words, a check is done as to whether or not any key provided on the keyboards 3, 4 and 5 is operated at the first step S1. The process defined at this step S1 is repeatedly executed until the key operation is detected. When the key input signal is issued, the process operation is advanced to a step S2 at which another check is done whether or not the detection switch 6 is brought into the ON-state. That is, it is judged whether or not the openable/closable member 2 is closed. As a result, if it is judged that the openable/closable member 2 is closed, since the operated key corresponds to the key of the telephone keyboard 3, a key process of the telephone mode, as defined after a step S4 is performed (will be described later). Conversely, when it is judged that the openable/closable member 2 is opened, since the operated key corresponds to the key of either the electronic notebook keyboard 4 or 5, a key process of the telephone notebook mode at the step S3 is executed.

Figure 11:
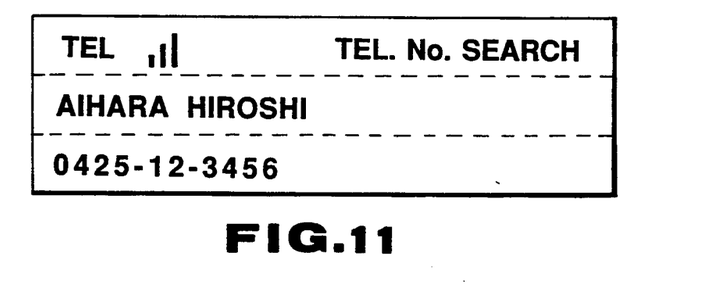
FIG. 11 shows another example of the representation of the display unit 10.

In accordance with the key process of the telephone mode, a check is done at a first step S4 as to whether or not the above-described key input operation is performed by operating the key 3a employed in the telephone keyboard 3. If YES (namely, the key 3a is operated), then the process operation is advanced to a step S5 at which the mode changing process is performed. This mode changing process is performed as shown in FIG. 10 as follows: When the key 3a is operated during the normal mode of the telephone function, the telephone directory data search mode is set so that first telephone directory data is displayed on the display unit 10; when the key 3a is operated during the telephone data searching mode, the schedule data search mode is set, whereby first schedule data is displayed on the display unit 10; and when the key 3a is operated during the schedule data search mode, the normal mode is set so that the reception standby condition is represented, namely the representation shown in FIG. 7 is returned. It should be noted that the data representation of the electronic notebook function searched in this telephone mode is different from the search data representation in the electronic notebook mode. For instance, when the searched data corresponds to the telephone directory data, the representation as shown in FIG. 8 is made in the electronic notebook mode, whereas another representation as indicated in FIG. 11 is made in the telephone mode. Then, when an S-key (will be described later) is operated under such a display condition as shown in FIG. 11, in a radio communication line setting process (will be explained later), the telephone number data being displayed is transmitted as dialing data via the burst mode controller 25 of the radio communication circuit unit 21 and the transmitter/receiver circuit unit 26 employed therein to the radio station (not shown in detail).

To the contrary, referring back to the flow chart shown in FIG. 9, when it is judged that the key 3a is not operated at the step S4, the process operation is advanced to a step S6 at which a judgement is made whether the above-described key input operation is carried out by operating the key 3b, or the key 3c. If YES (namely, key 3b or 3c is operated), then the process operation is advanced to a step S7 at which a search process is executed. As shown in FIG. 10, this process is to successively display data while the mode is set to either a telephone directory data search mode, a schedule data search mode. If the mode is set to the normal mode, even when the key 3b and/or the key 3c is manipulated, no process is carried out, but the process operation is returned to the previous step S1.

When a judgement is made that the key 3b and 3c are not operated at the process of the step S6, the process operation is advanced to a further step S8. At this step S8, a check is done whether or not the key input is made by manipulating the ON/Off key. When the ON/OFF key is operated at the step S8, the process operation is advanced to a step S9 at which the switching state of the switch circuit in the power source circuit 33 is changed. That is, when the switch circuit is brought into the ON-state, this power supply circuit 33 is turned OFF, whereas when the switch circuit is brought into the OFF-state, the power supply circuit 33 is turned ON. As a result, the power supply to the radio communication circuit unit 21 is controlled and thus the telephone function is ON/OFF controlled.

If a judgement result at the step S8 is made that the ON/OFF key is not operated, the process operation is advanced to a next step S10. At this step S10, a check is done whether or not the key input operation is performed by manipulating the dialing key (numeral entry key and "#" key). If this key input operation is done by operating the dialing key, the process operation is advanced to a subsequent step S11 at which an input process for the dialing data is performed. As previously stated, the dialing data inputted by operating the numeral entry key is displayed on the area 10c of the display unit 10. Then, the "#" key is used to cancel the inputted dialing data. It should be noted that when this input process of the dialing data is carried out after the S-key has been operated (will be described later), the input dialing data and a cancel signal produced in response to the operations of the "#" key are also transmitted via the burst mode controller 25 and the transmitter/receiver circuit 26 in the radio communication circuit unit 21 to the radio station. As represented in FIG. 10, this "#" key is used to not only cancel the dialing data, but also execute such a process that either the telephone directory data search mode, or the schedule data search mode is returned to the normal mode.

If another judgement result is made at the previous step S10 that the key input operation is not performed by manipulating the dialing key, namely if the key input operation is carried out by operating the S-key, the process operation is advanced to a further step S12 at which is performed for setting a ratio communication line between this first portable telephone apparatus and the radio station. As previously stated, the S-key is such a key manipulated when a call is accepted, and a call is transmitted. When this S-key is operated after a call is accepted, namely when the S-key is operated after an operator listens to the calling sound produced by driving the sound producing unit 30, under control of the control unit 27, the ID code of the radio station which has transmitted the call number, the self ID code and a response signal to the calling operation are sent out via the burst mode controller 25 and the transmitter/receiver circuit unit 26 employed in the radio communication circuit unit 21, so that a radio communication line is established between this radio station and the first portable telephone apparatus, and then the telephone communication mode is made. To the contrary, when this S-key is operated while no call is made, under control of the control unit 27, an ID code of a radio station where a radio communication is available, an own ID code and a call request signal are sent out via the burst mode controller 25 and the transmitter/receiver circuit unit 26 employed in the radio communication circuit unit 21 to this radio station in order to establish a radio communication line between this radio station and the first portable telephone apparatus. It should be noted that when the S-key is operated while the dialing data is set, namely when the S-key is manipulated after either the dialing data has been set by operating the numeral entry key, or the data about the telephone at the process of the step S7 has been selected, the dialing data is transmitted to the radio station via a radio communication line which has been set subsequent to the establishment of this radio communication line.

Advantages of First Portable Telephone Apparatus

In accordance with the above-described first preferred embodiment, since the keyboard to enter the data about the electronic notebook is provided at two different portions of the case body 1, namely the rear surface of the openable/closable member 2 on which upper surface, the telephone keyboard 3 is arranged, and also the region of the case body 1 covered by the openable/closable member 2, a large quantity of keys are arranged. Furthermore, since a large number of key functions are no longer given to a single key, the simple key operation to enter the data about the electronic notebook can be achieved. Also the switch 6 is employed to detect the open/close state of the openable/closable member 2, so that the state signal of this switch 6 is produced. When a detection is made that the openable/closable member 2 is opened based upon this state signal, namely when the electronic notebook keyboards 4 and 5 are exposed, the power supply to the radio communication circuit unit 21 is interrupted and therefore the telephone function is turned OFF (i.e., not operable). As a result, while the first portable telephone apparatus is used as the electronic notebook, any operators never receiver a telephone call. Accordingly, the data entry process for the telephone notebook is not bothered by the telephone call.

Not only the telephone keys, but also the keys 3a, 3b, 3c for searching the data about the electronic notebook are employed on the telephone keyboard 3 arranged on the upper surface of the openable/closable member 2. Since the telephone directory data and the schedule data can be displayed by manipulating these search keys, a telephone number and a name of a person who will be telephoned can be confirmed before a telephone conversation is made. Furthermore, if he wants to have an appointment during the conversation, the operator of this portable telephone apparatus can immediately confirm his own schedule. A telephone conversation may be, of course, made with employment of the telephone number of the searched telephone directory data.

Modifications

In the above-described first preferred embodiment, the depression button type switch 6 is mounted on the case body 1 so as to detect the opening/closing state of the openable/closable member 2. Not only such a depression button type switch, but also a pressure sensitive type switch and a light sensitive type switch may be utilized as this detection switch. Also, there is no limitation to mount this detection switch. Thus, any mounting places of the main body 1 may be selected, depending upon the types of the detection switch. For instance, this detection switch may be provided on a supporting member for supporting a rotation of the openable/closable member 2, and on this openable/closable member 2.

In the first preferred embodiment, the first portable telephone apparatus is so arranged that when the detection is made in response to the state signal of the detection switch 6 that the openable/closable member 2 is opened, the power supply to the radio communication circuit unit is immediately turned ON/OFF. When a radio telephone system is constructed in such a manner that a telephone transfer service and a voice (audio) storage service are available at a network side, when a detection is established that the openable/closable member 2 is opened in response to the state signal from the detection switch 6, a predetermined signal is transmitted to a radio station at a first stage. In other words, either a transfer demand signal for demanding that a present telephone call is transferred to another telephone set, or a voice storage service demanding signal for demanding that the present telephone call is connected to a voice storage service center, is sent out at a first stage, and thereafter the power supply to the radio communication circuit unit 21 is interrupted. It is, of course, possible to control the power supply to the radio communication circuit unit 21 by operating only the ON/OFF switch in a similar manner to that of the normal portable telephone apparatus. In this case, in response to the condition signal of the detection switch 6, the mode is selected from the telephone mode to the electronic notebook mode, and vice versa.

There are two sorts of electronic notebook data searchable in the telephone mode in the first preferred embodiment. Alternatively, only a single sort of telephone directory data may be employed. In the latter case, the key 3a for selecting the data sort is no longer required.

Figure 12:
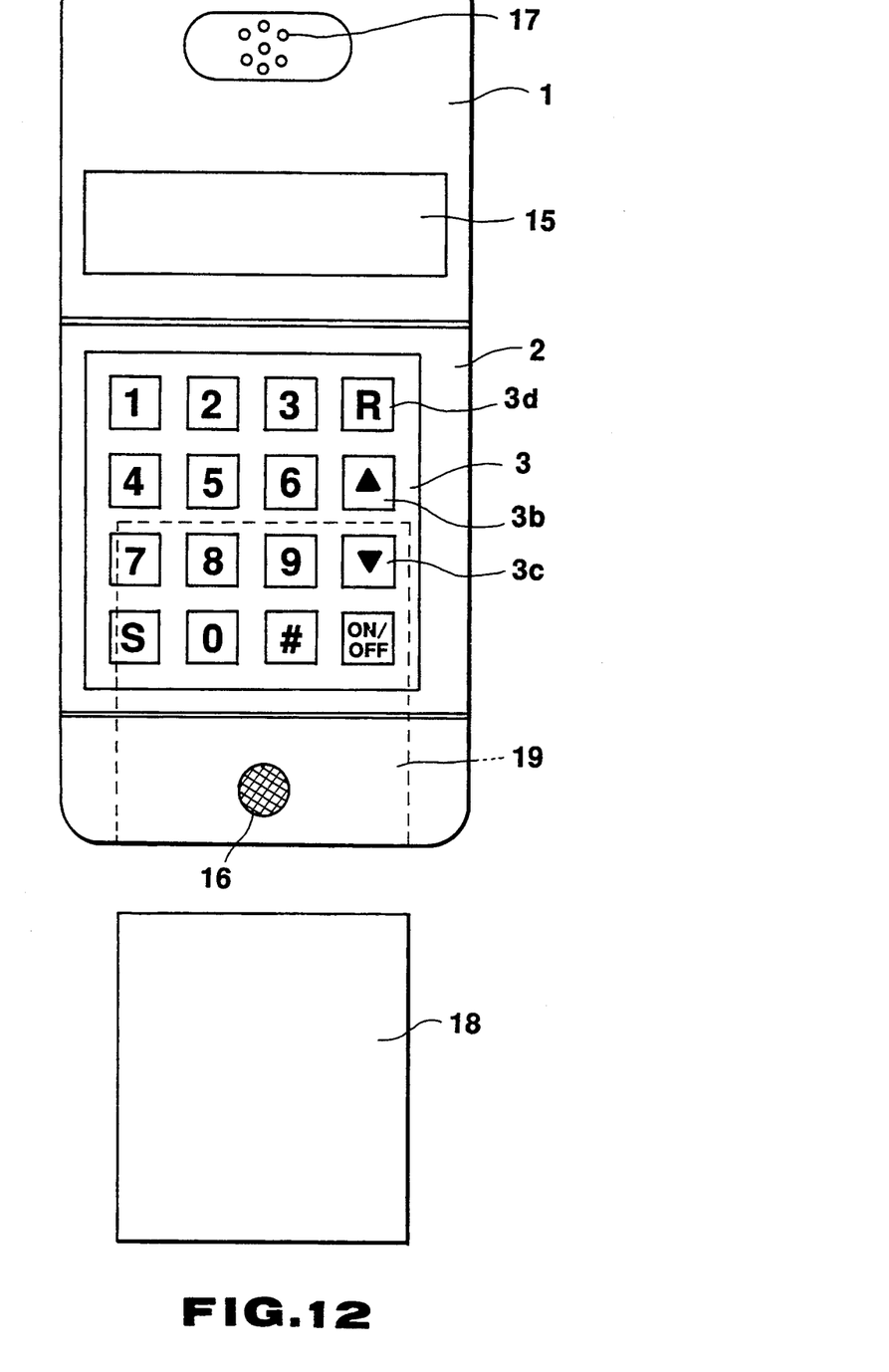
FIG. 12 is a front view of a portable telephone apparatus capable of equipping with an IC card.

To emphasize the electronic notebook function and the telephone function, a unit member including an IC such as an IC card 18 may be mounted on a portable telephone apparatus as a portable telephone apparatus equipped with an IC card 18 according to a second preferred embodiment of the present invention, as shown in FIG. 12. In this second portable telephone apparatus of FIG. 12, voice (audio) information may be recorded on the IC card 18. As represented in FIG. 12, the case body 1 includes a hole 19 for storing the IC card 18. Although not shown in this drawing, two pairing connectors are mounted on the tip portion of the IC card 18 and the wall of the storing hole 19. One connector mounted on the wall of the storage hole 19 is electrically connected to the control unit 27 and the speech coding unit 24. A RAM built in this IC card 18 is electrically connected to the control unit 27 and the speech coding unit 24 when the IC card 18 is inserted into the storing hole 19. As a result, when a recording switch 3d employed on the keyboard 3 is manipulated during a telephone communication, a telephone conversation including a voice of a telephone speaker and/or a voice of a telephone listener can be recorded on the IC card 18. If the power supply to the radio communication circuit unit 21 is controlled by manipulating only the ON/OFF switch, and also an IC card having a ROM for previously storing an answering message and/or a RAM for a recording purpose is employed as the IC card 18, when the electronic notebook mode is set by opening the openable/closable member 2, a similar process operation to that of a telephone answering machine may be carried out. That is, when a telephone call is detected, the answering message stored in the ROM is reproduced and then is sent to the radio station. At the same time, or after the answering message has been reproduced, a process for recording a voice of a telephone listener is carried out in the RAM. This recording process should be preferably performed without driving the sound producing unit 30 when a telephone calling is detected in order that the key input process in the electronic notebook mode is smoothly performed.

It should also be noted that as an IC card having an improved electronic notebook function, an IC employed in this IC card is arranged by a ROM, and dictionary data are stored in this ROM. In this case, the IC card having the dictionary data is electrically connected to the control unit 27 via the connector mounted on the wall of the storing hole 19, so that the contents of the storage data in the ROM are displayed on the display unit 10 under control of the control unit 27.

I claim:

1. A portable telephone apparatus having an electronic notebook function, comprising:
   a body casing having an openable member pivotally journaled thereto, the openable member being pivotable between an open position and a closed position;
   a radio-communication circuit unit and an electronic-notebook circuit unit, both held within said body casing;
   mounted-in memory means, held within said body casing, for storing electronic-notebook data;
   a display unit mounted on said body casing;
   a plurality of telephone-operation keys provided on an outer surface of said openable member;
   a plurality of electronic-notebook operation keys provided on an inner surface of said openable member and a surface of said body casing so as to be concealed by said openable member when said openable member is pivoted to the closed position, said electronic-notebook operation keys including search key means;
   said search key means being provided on the outer surface of said openable member, for searching through said mounted-in memory means for desired electronic-notebook data stored therein;
   first power-source means for supplying power to said radio-communication circuit unit;
   second power-source means for supplying power to the telephone apparatus excluding said radio-communication circuit unit;
   judging means for detecting whether said openable member is at the open position or the closed position;
   switch-control means including:
   first means for setting an operation mode of the telephone apparatus to a telephone mode and for causing said first power source means to supply power to said radio-communication circuit unit, when said judging means determines that said openable member is at the closed position, and
   second means for setting the operation mode of the telephone apparatus to an electronic-notebook mode and for causing said first power source means to stop supplying power to said radio-communication means, when said judging means determines that said openable member is at the open position; and
   display-control means for causing said display unit to display data in the telephone mode when said openable member is at the closed position, with said data being produced from the electronic-notebook data stored in said mounted-in memory means in response to operation of said search key means.

2. A portable telephone apparatus according to claim 1, wherein said switch-control means switches the operation mode of the telephone apparatus to the electronic-notebook mode when said search key means is operated in the telephone mode, and returns the operation mode of the telephone apparatus to the telephone mode when said search key means is operated in the electronic-notebook mode.

3. A portable telephone apparatus according to claim 1, wherein the operation mode of the telephone apparatus is settable to a schedule mode, and said switch-control means switches the operation mode of the telephone apparatus to the electronic-notebook mode when said search key means is operated in the telephone mode, switches the operation mode of the telephone apparatus to the schedule mode when said search key means is operated in the electronic-notebook mode, and returns the operation mode of the telephone apparatus to the telephone mode when said search key means is operated in the schedule mode.

4. A portable telephone apparatus according to claim 1, wherein said body casing further comprises receiving means for detachably receiving card-type memory means for expanding a memory capacity of said mounted-in memory means held within said body casing.

5. A portable telephone apparatus according to claim 1, wherein said body casing further comprises receiving means for detachably receiving card-type memory means for recording audio data.

6. A portable telephone apparatus according to claim 1, wherein said display-control means causes said display unit to display data in a predetermined display state in the electronic-notebook mode, with said data being searched from the electronic notebook data stored in said mounted-in memory means in response to said plurality of electronic-notebook operation keys, and causes said display unit to display data in another display state in the telephone mode when said openable member assumes the closed position, with said data being searched from the electronic-notebook data stored in said mounted-in memory means in response to operation of said search key means.

7. A portable telephone apparatus according to claim 1, further comprising externally-operable transmitting means for transmitting a phone number when operated, said phone number being searched in response to operation of said search key means from the electronic notebook-data stored in said mounted-in memory means in the telephone mode when said openable member assumes the closed position and when said display unit displays said searched telephone-number.

8. In a portable telephone apparatus with a telephone function and an electronic-notebook function, comprising a body casing having an openable member pivotally journaled thereto, the openable member being pivotable between an open position and a closed position; radio-communication circuit means for performing the telephone function, an electronic-notebook circuit unit and a memory for storing electronic-notebook data, all mounted within the body casing; a plurality of telephone-operation keys provided on an outer surface of the openable member; a plurality of electronic-notebook operation keys including search key means provided on an inner surface of the openable member and a surface of the body casing so as to be concealed with the openable member when the openable member assumes the closed position; and     a search key provided on the outer surface of the openable member, for searching through the electronic-notebook data stored in the memory for desired data, a method of switching an operation mode of the telephone apparatus comprising the steps of:

judging whether the openable member is at the open position or the closed position;

setting an operation mode of the telephone apparatus to a telephone mode when it is judged that the openable member is at the closed position;

setting the operation mode of the telephone apparatus to an electronic-notebook mode when it is judged that the openable member is at the open position;

supplying power to the radio-communication circuit means when the operation mode of the telephone apparatus is set to the telephone mode, and stopping the supply of power to the radio-communication circuit means when the operation mode is set to the electronic-notebook mode;

searching, by means of the search key, through the electronic-notebook data stored in the memory for a desired data in the telephone mode when the openable member is at the closed position;

displaying the searched desired data on the display unit in the telephone mode when the openable member is at the closed position; and transmitting a telephone number by a predetermined operation in the telephone mode when the openable member is at the closed position, the telephone number corresponding to the searched data displayed on the display unit.

* * * * *